United States Patent
Xu et al.

(10) Patent No.: US 10,321,468 B2
(45) Date of Patent: Jun. 11, 2019

(54) NCT SCC ACTIVATION CONTROL DEVICE AND METHOD, MANAGEMENT METHOD AND BASE STATION DEVICE

(71) Applicant: SONY CORPORATION, Tokyo (JP)

(72) Inventors: Xiaodong Xu, Beijing (CN); Yateng Hong, Beijing (CN); Ya Liu, Beijing (CN)

(73) Assignee: SONY CORPORATION, Tokyo (JP)

( * ) Notice: Subject to any disclaimer, the term of this patent is extended or adjusted under 35 U.S.C. 154(b) by 90 days.

(21) Appl. No.: 14/912,314

(22) PCT Filed: Aug. 13, 2014

(86) PCT No.: PCT/CN2014/084231
§ 371 (c)(1),
(2) Date: Feb. 16, 2016

(87) PCT Pub. No.: WO2015/035841
PCT Pub. Date: Mar. 19, 2015

(65) Prior Publication Data
US 2016/0212752 A1 Jul. 21, 2016

(30) Foreign Application Priority Data
Sep. 12, 2013 (CN) .......................... 2013 1 0415651

(51) Int. Cl.
*H04W 72/08* (2009.01)
*H04L 5/00* (2006.01)
(Continued)

(52) U.S. Cl.
CPC ........... *H04W 72/085* (2013.01); *H04L 5/001* (2013.01); *H04L 5/006* (2013.01); *H04L 5/0048* (2013.01);
(Continued)

(58) Field of Classification Search
CPC ... H04W 72/08; H04W 72/085; H04W 76/18; H04W 24/04; H04L 5/0051; H04L 5/006;
(Continued)

(56) References Cited

U.S. PATENT DOCUMENTS

2011/0310753 A1* 12/2011 Chou .................... H04W 48/16
370/252
2012/0314675 A1 12/2012 Vujcic
(Continued)

FOREIGN PATENT DOCUMENTS

CN 102238747 A 11/2011
CN 102792752 A 11/2012
WO WO 2011/102686 A2 8/2011

*Primary Examiner* — Mandish K Randhawa
(74) *Attorney, Agent, or Firm* — Xsensus LLP

(57) ABSTRACT

A New Carrier Type (NCT) Secondary Component Carrier (SCC) activation control device and method, an management method and a base station device. The activation control device includes: a measuring module configured to perform radio link measurement to an SCC by measuring at least one of a demodulation reference signal DM-RS and a channel status indicator reference signal CSI-RS; and an activation control module configured to perform activation control to the SCC based on a measurement result.

14 Claims, 3 Drawing Sheets

(51) Int. Cl.
  *H04W 24/04* (2009.01)
  *H04W 76/18* (2018.01)
(52) U.S. Cl.
  CPC .......... *H04L 5/0051* (2013.01); *H04L 5/0053* (2013.01); *H04L 5/0085* (2013.01); *H04L 5/0098* (2013.01); *H04W 24/04* (2013.01); *H04W 72/08* (2013.01); *H04W 76/18* (2018.02); *H04L 5/0073* (2013.01)
(58) Field of Classification Search
  CPC ..... H04L 5/001; H04L 5/0098; H04L 5/0048; H04L 5/0053; H04L 5/0085; H04L 5/0073
  See application file for complete search history.

(56) References Cited

U.S. PATENT DOCUMENTS

| | | | | |
|---|---|---|---|---|
| 2013/0079049 | A1* | 3/2013 | Yu .................. | H04W 48/16 455/524 |
| 2013/0114560 | A1* | 5/2013 | Liu .................. | H04L 1/0026 370/329 |
| 2013/0136015 | A1 | 5/2013 | Ojala et al. | |
| 2013/0301542 | A1* | 11/2013 | Krishnamurthy ..... | H04W 52/50 370/329 |
| 2014/0269368 | A1* | 9/2014 | Xu .................. | H04W 24/00 370/252 |
| 2014/0362720 | A1* | 12/2014 | Kim .................. | H04B 7/024 370/252 |
| 2015/0189627 | A1* | 7/2015 | Yang .................. | H04L 5/0098 370/280 |

\* cited by examiner

NCT SCC ACTIVATION CONTROL DEVICE AND METHOD, MANAGEMENT METHOD AND BASE STATION DEVICE

TECHNICAL FIELD

The present invention relates to communication field, and particularly to a New Carrier Type (NCT) Secondary Component Carrier (SCC) activation control device and method, an activation management method and a base station device.

BACKGROUND ART

Small Cell Enhancement (SCE), which is the focus for Rel-12 standardization, relates to many aspects, such as NCT of the physical layer. NCT is a key supporting technique of a physical layer of the SCE, and is first proposed in carrier aggregation enhancement of Rel-11. Therefore, the initially discussed scene of NCT is SCC, which serves User Equipment (UE) by way of carrier aggregation. WI of NCT in Rel-12 is approved in the RAN #57 meeting, and WID is updated in the RAN #58 meeting. The standardization work of NCT mainly includes two stages as followed.

Some characteristics of NCT are defined in RP-122028, mainly including: the NCT design has reduced traditional control signaling and common reference signals transmitted on carriers, thereby reducing the interference and transmission load of the control channel and improving the throughput capacity and the system frequency band utilization efficiency of users. The above characteristic of NCT can be better support edge users in homogeneous networks and cell range expansion areas of heterogeneous networks. Meanwhile, NCT can support new scenes, for example, NCT can allow a BS (base station) to switch off the current carriers when there is no data transmission, which further reduces the network power consumption and improves the energy efficiency. In standardization, NCT is classified into non-standalone NCT (referred to as NS-NCT) and standalone NCT (referred to as S-NCT). NS-NCT means that when a frequency resource block does not support independent operations of NCT, for example, in an asymmetrical FDD frequency spectrum scene, NCT can be used only after aggregation with a traditional LTE carrier. NS-NCT can be further classified into synchronized and unsynchronized carriers, wherein synchronized NCT does not need to transmit synchronizing signals and performs time-frequency domain synchronization by way of an aggregated traditional LTE carrier, while unsynchronized NCT needs to transmit synchronizing signals for synchronization.

Stage 1:

Standardization is performed to the scenes of NS-NCT. NCT coexists with backward compatible carriers through carrier aggregation. The above scene can be further classified into two different scenes of synchronized and unsynchronized carriers.

At the same time, this stage also includes studies on S-NCT, and assesses its main application scenes and potential advantages to determine whether it is necessary to study S-NCT scenes.

Stage 2:

Depending on the assessment results in Stage 1, if it needs to further study S-NCT, standardization needs to be performed for S-NCT scenes with reference to the ST study results of SCE and the determined optimization principles.

Currently, NS-NCT is the main scene discussed for standardization. The definition of NS-NCT has been approved in the RAN #57 meeting, i.e., when a target frequency resource block does not support independent operations of NCT, for example, in an asymmetrical FDD frequency spectrum scene, NCT can be used only after aggregation with a traditional LTE carrier.

In addition, consensus has been reached on the motivation of introducing NCT to carrier aggregation scenes in the RAN1 #66bis meeting, mainly including the following three items:

(1) to improve the frequency spectrum efficiency;
(2) to support deployment of heterogeneous networks; and
(3) to facilitate energy-saving.

To realize the above three objectives, when designing NCT, some common control channels/signals, such as CRSs, should be removed as much as possible. However, CRSs are crucially important for some mechanisms, such as time-frequency synchronization of UE, RRM measurement and cell handover etc., so how to realize these mechanisms in the NCT scene is a major task for standardization. Main functions of CRSs are listed as below in the LTE Rel-8/9 version:

(1) to demodulate downlink data (TMs1-6), control channels and PBCH channels;
(2) to calculate CSI feedback (TMs1-8);
(3) to perform time-frequency domain synchronization of UE;
(4) to perform mobility measurement (RSRP/RSRQ) under RRC-IDLE and RRC-CONNECTED states; and
(5) to perform RLM measurement under the RRC-CONNECTED state.

A non-codebook based pre-coded transmission mode TM9 is introduced in the LTE Rel-11 version. TM9 supports 8-layer transmission at a maximum capacity, increasing the transmission efficiency. TM9 performs data demodulation using demodulation reference signals (DM-RS); for the CSI feedback, estimates channel conditions using channel status information reference signal CSI-RSs to ensure the feedback accuracy, and estimates interference conditions using CRSs.

Based on the current discussion results, usable reference signals in NCT include the following types:

(1) PSS/SSS

Primary synchronization signals (PSSs) and secondary synchronization signals (SSSs) are mainly used to perform initial symbol synchronization and frame synchronization. For synchronized carrier scenes of NCT, since the synchronization information of a cell is obtained through a traditional carrier, PSSs/SSSs may be removed in NCT to further improve the resource utilization efficiency of NCT. However, some proposals show that the gains obtained through PSS/SSS removal are not obvious, greater influence will be caused to standardization and the complexity of UE will be increased. Therefore, currently there is no consensus on the removal of PSSs/SSSs in synchronized carrier scenes of NCT, and further discussion is needed still.

(2) DM-RS

Different from cell-specific CRSs, DM-RSs are UE-specific reference signals, transmitted in certain PRBs and used for demodulation of UE data channels. The DM-RSs of different UE may occupy the same RE distinguished by CDM. In addition, resource allocation for DM-RSs is finished before precoding, so DM-RSs include precoding gains. There is a problem of Collision between DM-RSs and PSSs/SSSs in NCT. According to current discussions of the 3GPP, PSS/SSS shifting and DM-RS puncturing are mainly considered to improve the performance of physical downlink shared channels (PDSCHs), to facilitate demodulation of PDSCHs/ePDCCHs (enhanced physical downlink control channels) and to avoid resource collision. In this way, support for future standardization evolution may help to be obtained.

(3) CSI-RS (Channel Status Information Reference Signal)

As DM-RSs in the R10 version, CSI-RSs are introduced to support 8-antenna configurations in LTE-A, to estimate channels conditions of PDSCHs and to realize beamforming. CSI-RSs are distributed with even intervals in the frequency domain, but are sparsely distributed in the time domain. Similarly, CSI-RSs occupying the same RE are distinguished by CDM. In addition, CSI-RSs are UE-specific reference signals and configured by the BS before use.

(4) Reduced CRS

Since there is no transmission of CRSs and ePDSCCH of NCT are demodulated based DM-RSs, the transmission mode of NCT does not support TMs1-8. Therefore, to replace CRS in NCT, problems to be solved include time-frequency domain synchronization, radio resource management (RRM) measurement and interference measurement under the TM9 mode. To solve the above problems (including synchronization and RRM measurement), the current discussion result is to increase Reduced CRSs (Reduced Cell-specific reference signals). Reduced CRSs still base on CRSs, use port0 ports and sequences in Rel-8, and are transmitted once by every 5 ms. Reduced CRSs are also called Traditional CRS (TRS), extended Synchronization Signal (eSS) etc.

Reduced CRS solutions are still under RAN4 discussion, since simulations find that performance loss is present in the scenes of relatively small carrier bandwidths. Therefore, if the conclusion of RAN4 is to increase the reference signal density, RAN1 needs to re-design Reduced CRS.

Much content is yet to not be determined for Reduced CRS. For example, whether subframe offset needs to be introduced to the position of the subframe of Reduced CRS? Obviously, introduction of subframe offset may potentially alleviate interference problems, but it will increase the complexity. Meanwhile, different companies disagree on whether cell-specific frequency offset should be maintained for Reduced CRS. In all, the specific content of Reduced CRS needs improvement.

A carrier aggregation mechanism is introduced to the LTE Rel-10 version to meet the requirement that the transmission bandwidth should reach 100 MHz in IMT-A. The carrier aggregation mechanism is mainly realized by RRM measurement. For carrier aggregation, the purpose of RRM measurement is not only to perform mobility management for UE but to realize activation and deactivation of component carriers.

RRM considers QoS parameters (QCI/GBR/AMBR) in a comprehensive way, including the prior conditions such as configuration of wireless load, the terminal reception capability and the carrier load condition, and configures one carrier set for each UE. Then, the UE measures the cells in its carrier set based on multiple measurement events defined by the standards, and reports the measurement result to the network side, which performs activation and deactivation to SCC based on the measurement result. Since UE may be configured with multiple component carriers (referred to as CCs), the UE must keep communication with one PCell and at most four SCells. The UE no longer performs cell measurement for handover, but selects the most suitable cell or cells to provide services based on the current radio environment. The UE may measure multiple cells using different measurement events. For A3 and A5 events, the reference cell is PCell which is providing services, and the measurement object may be any frequency or the SCell which is providing services; and A6 events only provide handover measurement among SCells of the same frequency. In the UE's carrier set, measurement of an activated cell should be consistent with the process defined in Rel-8, whose measurement interval is UE-specific, while the measurement interval of a non-activated SCell is configured by RRC signaling.

At the same time, activation/deactivation of component carriers (CCs) may be controlled by the network side. Now, the network issues a UE activation/deactivation MAC control unit to activate/deactivate SCCs, but the MAC layer only reports random access failure and retransmission failure problems of PCell to a higher level. Reporting of the channel quality indicator (CQI) is directed for an activated SCell only, and the radio link condition of a non-activated SCell cannot be provided. However, RRM measurement can be performed to activated or non-activated downlink secondary component carriers (DL SCCs). The RRM measurement result can reflect the current radio link quality of a DL SCC, and help the network side to decide if the corresponding SCell is suitable for providing services for the UE.

In an LTE/LTE-A system, a radio link management (RLM) mechanism is mainly used to monitor the radio link of a primary component carrier PCC to determine if the radio link status is normal, ensuring the reliability of the radio communication system. In the activation/deactivation of DL SCCs in Rel-10/11, the RLM mechanism is not applied due to the following reasons:

(1) the BS is capable of detecting whether the DL SCC radio link quality deteriorates based on CQI reporting (for activated DL SCCs) and the current RRM measurement reporting (for activated or deactivated DL SCCs) mechanisms;

(2) the RRM reporting mechanism (such as A2event) is capable of reporting DL SCCs with deteriorated link quality; compared with CQI measurement, filtering of RRM measurement results has been performed at the UE side, and deactivation of DL SCCs can be performed so long as the network side configures RRM measurement for the UE;

(3) after radio link failure (RLF) occurs to DL SCCs, the UE cannot automatically deactivate the corresponding SCCs so that the carrier sets at the eNodeB side and the UE side do not match; and (4) using the RLM mechanism for SCC activation control will increase the complexity of UE.

In Rel-10/11, the activation/deactivation of SCell is controlled by the eNodeB. Specifically, a traditional RRM measurement-based SCC activation/deactivation process is as below:

1. detecting the presence of a CC (acquiring the physical Cell ID through PSS/SSS);

2. acquiring the master information block (MIB) information (including the bandwidth, the PHICH configuration and the system frame number etc.);

3. measuring the signal quality of the CC (RSRP/RSRQ measurement based on CRSs);

4. performing measurement and reporting based on defined measurement and reporting events (such as A6 events and the aforementioned instantaneous RRM measurement); and 5. deciding by the BS whether to activate/deactivate the CC by the UE based on the measurement and reporting result.

At the same time, the network side may configure a timer for the UE side. When the UE does not receive data and PDCCH messages, SCCs may be deactivated automatically. The steps are as below:

1. the UE keeps one sCellDeactivationTimer timer for each SCell;
2. before the timer times out, the UE does not receive any data and PDCCH message; and
3. when the timer times out, the UE deactivates the corresponding SCell automatically.

However, in NCT scenes, PSS/SSS and physical broadcasting channels (PBCHs) may be removed, which will substantially affect the current carrier aggregation mechanisms. For example, once the PSS/SSS and PBCHs are removed, detecting CCs and acquiring the MIB of cells will become difficult. For synchronized NCT, the presence of NCT carriers and system information (such as PCI, SFN and bandwidth) can be indicated by traditional carriers. In addition, system bandwidth information may not be crucially important for RRM measurement (since the UE may only measure several RBs at the central frequency). In addition, since NCT is used as SCC only, the configuration information of physical hybrid-ARQ indicator channels (PHICHs) is unnecessary.

As shown by the above description, in NCT scenes, the configuration of reference signals is changed substantially, so that traditional SCC activation control solutions are not suitable for NCT scenes. Currently, there is no effective solution on how to perform SCC activation control in NCT scenes.

SUMMARY OF THE INVENTION

Regarding the problem that the prior arts cannot perform SCC activation control in NCT scenes, the present invention proposes an NCT SCC activation control device and method, an activation management method and a base station device, which can perform activation control to the NCT SCC and solve the problem in the prior arts.

According to one aspect of the present invention, an NCT SCC activation control device is provided. The device comprises: a measuring module configured to perform radio link measurement to an SCC by measuring at least one of a demodulation reference signal DM-RS and a channel status indicator reference signal CSI-RS; and an activation control module configured to perform activation control to the SCC based on a measurement result.

According to another aspect of the present invention, an NCT SCC activation control method is provided. The method comprises: performing radio link measurement to an SCC by measuring at least one of a demodulation reference signal DM-RS and a channel status indicator reference signal CSI-RS; and performing activation control to the SCC based on the measurement result.

According to another aspect of the present invention, a base station device is provided and is configured to manage a carrier set of user equipment containing an NCT SCC. The base station device comprises: a communication module configured to receive from the user equipment a result of radio link measurement performed to an SCC by using at least one of a demodulation reference signal DM-RS and a channel status indicator reference signal CSI-RS; and a management module configured to manage an activation status of the SCC contained in the carrier set of the user equipment based on a measurement result.

According to another aspect of the present invention, an NCT SCC management method is provided and configured to manage a carrier set of user equipment containing an NCT SCC. The management method comprises: receiving from the user equipment a result of radio link measurement performed to an SCC by using at least one of a demodulation reference signal DM-RS and a channel status indicator reference signal CSI-RS; and managing an activation status of the SCC contained in the carrier set of the user equipment based on a measurement result.

According to the new characteristics of NCT and changes of the network structure, the present invention proposes reference signals used in NCT SCC measurement, which can accurately and reasonably measure NCT SCCs and facilitate realization of activation control/management of carriers through the RLM and RRM mechanisms.

BRIEF DESCRIPTION OF THE DRAWINGS

To describe the technical solutions of the embodiments of this invention or the prior arts clearly, the drawings required for the embodiments of this invention are briefly introduced. Obviously, the drawings described below only show some embodiments of this invention, and other drawings may be obtained based thereon by those skilled in the art without any inventive work.

EMBODIMENTS

Figure 1:
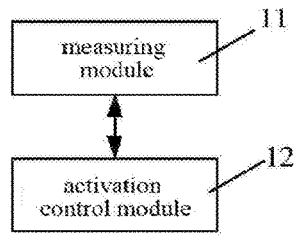
FIG. 1 is a block diagram of the NCT SCC activation control device according to an embodiment of this invention.

The exemplary embodiments of this invention will be described below with reference to the drawings. To make it clear and brief, all the features of actual embodiments are not described in the description. However, it should be understood that various decisions specific to the embodiments must be made in developing any such embodiment to realize the specific targets of development personnel, for example, necessary restricting conditions related to the system and services may be satisfied, and such restricting conditions may differ depending on different embodiments. It should also be understood that although development may be complex and time-consuming, such work is a routine task for those skilled in the art which profit from the disclosure of this application.

In addition, it should be noted that, to avoid obscuring this invention due to unnecessary details, only the device structures and/or processing steps closely related to the solutions of this invention are shown in the drawings, while other details not closely related thereto are omitted.

An embodiment of this invention provides an NCT SCC activation control device.

FIG. 1 shows the structure of the NCT SCC activation control device according to an embodiment of this invention.

As shown in FIG. 1, the NCT SCC activation control device according to an embodiment of this invention comprises:

a measuring module 11 configured to perform radio link measurement to an SCC by measuring at least one of a demodulation reference signal DM-RS and a channel status indicator reference signal CSI-RS; and an activation control module 12 configured to perform activation control to the SCC based on a measurement result.

Therefore, this invention has defined the reference signals used in SCC activation control. As a known sequence, a reference signal is usually used in signal demodulation and channel quality measurement. A CSI-RS is introduced as a reference signal for channel quality measurement in Rel-10. Since a CSI-RS is UE-specific, it cannot be configured before UE is aggregated therewith, and the corresponding channel quality information cannot be obtained. Therefore, if a CSI-RS is needed for performing radio link measurement to an SCC, a base station needs to configure a CSI-RS for UE in advance. For example, when configuring a CSI-RS, the BS needs to communicate with the UE to inform a transmitting position of the CSI-RS (that is, the transmitting position can be understood as the configuration information of the CSI-RS) to the UE, so that measurement can be performed using the CSI-RS. On the other hand, a DM-RS is initially used as a reference signal for signal demodulation and also is UE-specific. If a DM-RS is to be used for SCC activation, the BS needs to inform the position of the data resource block transmitting the DM-RS (the position can be understood as the configuration information of the DM-RS) to the UE, so that measurement can be performed using the DM-RS. For example, when the UE first finds a usable NCT carrier present in a current area (by detecting synchronization signal of the NCT carrier or by indication of a macro BS, the UE can know if the current area has a usable NCT carrier), the UE will try to access the NCT carrier and needs to measure a reference signal of the carrier. Therefore, the UE will send a request to the BS of a PCC carrier (which may be a BS for a legacy carrier, for example), so that a CSI-RS/DM-RS on the NCT carrier can be configured for the UE by the BS.

In addition to the above method of performing measurement based on the received configuration information of a CSI-RS/DM-RS, according to another embodiment, fixed resources can be reserved at a certain interval for SCC measurement. The BS can transmit known sequences (a reference signal is substantially a known sequence) on these resources, and the UE knows the position of the resource block to be measured (the configuration information) of the NCT carrier in advance, so it is unnecessary to transmit confirmation information between the BS and the terminal in advance. The measurement purpose can be achieved by receiving, by the UE, known sequences transmitted on the fixed resources.

In all, the measuring module 11 is configured to perform radio link measurement to the SCC using at least one of the DM-RS and CSI-RS based on the configuration information of the DM-RS and/or CSI-RS.

In one embodiment, the radio link measurement performed by the measuring module 11 to the SCC includes RLM measurement, and the activation control module 12 is configured to deactivate the SCC when the RLM measurement determines that a radio link failure (RLF) occurs to the SCC.

In addition, the activation control device according to an embodiment of this invention further comprises: a communication module (not shown) configured to inform (report) the RLF of the measured SCC and/or the deactivation (or a deactivation decision) of the SCC to a network side. For example, the communication module may inform such information to the master BS managing carrier sets. In one embodiment, only an RLF of the SCC may be reported. At this time, a corresponding identification of the SCC should be informed to the network side, so that the network side can decide to deactivate the SCC based on the reported information. In another embodiment, the UE may decide to deactivate the SCC based on the RLF of the SCC, and only inform the deactivation decision for the measured SCC to the network side, so that the network cell managing carrier sets of the network side can maintain and update the carrier use status based on that decision.

In one embodiment, in addition to RLM measurement to the SCC, the radio link measurement performed by the measuring module 11 to the SCC includes RRM measurement, and the activation control module 12 is configured to perform corresponding activation control to the SCC based on an activation/deactivation instruction determined by a base station based on an RRM measurement result. That is, after the RRM measurement, the BS will determine that activation/deactivation of the measured SCC is performed based on an RRM measurement result and generate a corresponding instruction. The activation control module 12 will activate/deactivate the SCC according to the instruction generated by the BS. A CSI-RS may be used when performing RRM measurement. In an alternative embodiment, the RRM measurement mechanism may be realized through a Reduced-CRS. Since the port0 port of a CRS in Rel-8 is still used, changes to the standards are relatively small.

In another embodiment, when performing the RLM measurement to the SCC, the measuring module 11 is configured to measure an enhanced physical downlink control channel (ePDCCH) and/or a physical downlink shared channel (PDSCH) using a DM-RS.

At this time, the measuring module 11 is further configured to, when a radio link problem (RLP) of the SCC has been detected during the RLM measurement, detect a cause of the RLP and report the cause to the BS, so as to assist the UE in recovering the RLP by the BS. When recovering the RLP, radio link recover (RLR) detection may be performed.

In fact, the solution of this invention (such as the RLM mechanism of this invention) includes the following states: a normal state, detection of an RLP/recovery from an RLP, and RLR detection. A switching condition for the other two states includes detection of an RLP/recovery from an RLP. That is, in the normal state, once an RLP is detected, an RLR stage is entered. In the RLR detection process, if recovery from an RLP is detected, the normal state is recovered. Detecting a cause of an RLP and reporting the same to the BS is a process inserted into the RLR stage. The purpose is that, by assisting the UE in recovering the RLP by the BS, the recovery speed can be further improved and the recovery success rate can be increased.

Specifically, after detecting a presence of RLP, the RLR detection stage is entered. During the RLR detection, the measuring module 11 is configured to determine the cause of the RLP by detecting a type thereof, wherein the type of the RLP includes local frequency band deep fading and excessive local frequency band interference (for example, the interference level of a local frequency band is higher than a predetermined value or an average value of the interference level of other frequency bands). When determining the type of the RLP, the measuring module 11 measures a full frequency band of the SCC using at least one of a CSI-RS and a Reduced CRS, and compares a measurement result of the full frequency band and a measurement result of a local frequency band of the ePDCCH/PDSCH to determine the type of the RLP.

Specifically, when performing full frequency band measurement to the SCC, the measurement Ways may include: (Way I) measuring the full frequency band of the SCC to obtain measurement result of a local frequency band of the ePDCCH/PDSCH (the measurement result may be RSRP, RSRQ, etc.) and measurement result of other frequency bands (or an average RSRP/RSRQ of other frequency bands); comparing the measurement result of the local frequency band with the measurement result of other frequency bands; if the measurement result of the local frequency band is lower than the measurement result of the full frequency band, determining the RLP type as local frequency band deep fading; and (Way II) measuring the interference of the full frequency band of the SCC to obtain an interference level of a local frequency band of the ePDCCH/PDSCH and an interference level of other frequency bands (or an average interference level of other frequency bands); after comparison of the two results, if the interference level of the local frequency band is higher than the interference level of the full frequency band, determining the RLP type as excessive local frequency band interference.

According to the Way I, if the RLP type is determined as local frequency band deep fading, that is, the cause of the RLP is deep fading of a local frequency band of the ePDCCH/PDSCH, the measurement result can be reported to the BS through an uplink PCC (UL PCC), and extra channel quality information indicators may be carried to indicate the several subbands in the current measurement result having the best channel quality. After the BS receives the reporting from the UE, frequency diversity may be used for the ePDCCH/PDSCH or the frequency domain position of the ePDCCH/PDSCH may be adjusted to assist the UE in recovering from the RLP.

According to the Way II, if the RLP type is determined as excessive local frequency band interference, that is, the cause of the RLP is that a local frequency band of the ePDCCH/PDSCH has excessive interference, the measurement result can be reported to the BS through a UL PCC, and interference information of the current channels may be carried. After the BS receives the reporting from the UE, frequency domain inter-cell interference coordination (ICIC) and the like may be performed to assist the UE in recovering from the RLP.

In one embodiment, full frequency band measurement may be performed according to the above Way I. If the RLP type cannot be determined according to the above Way I, full frequency band measurement may be further performed according to the above Way II. In another embodiment, measurement may be performed according to the above Way II first. If the RLP type cannot be determined according to the above Way II, full frequency band measurement may be further performed according to the above Way I. In other embodiments, the measuring module may use other ways to perform full frequency band measurement, combined with the above Way I and/or Way II. In addition, when performing full frequency band measurement using other ways, other causes for the RLP can be obtained based on the measurement result. In this time, other ways may be used to assist the UE in recovering from the RLP.

The previous content has described the forming process of the cause of an RLP (or the RLP type detection process). The objective of detecting the cause of an RLP is to assist the UE in recovering from the RLP as quickly as possible. If the UE cannot be recovered, it is determined that the currently measured SCC has an RLF, and the activation control module 12 needs to deactivate the SCC.

When performing RLR detection, the measuring module 11 is further configured to perform RLR detection to the SCC. Specifically, when performing RLR detection, the measuring module 11 is further configured to perform RLR detection to a local frequency band of the SCC using a DM-RS (that is, subband RLR detection) and/or perform RLR detection to a full frequency band of the SCC using a Reduced CRS (that is, wide band RLR detection), wherein if it is determined through the RLR detection that the SCC cannot recover from the RLP, the measuring module 11 determines that the SCC has an RLF.

That is, during the RLR detection, RLR detection can be performed by a traditional RLM mechanism. If RLP type detection can be performed using the above Way I and/or Way II during RLR detection so as to effectively determine a cause of the RLP, the recovery speed can be improved by way of frequency diversity, frequency domain position adjustment of the ePDCCH/PDSCH and/or frequency domain ICIC and the like, thereby increasing the success rate of RLR detection.

In the aforementioned solution, no matter if RLM measurement is performed to the SCC to determine the presence of an RLP, RLR detection is performed to a local frequency band of the SCC or RRM measurement is performed to the SCC, when measuring the PDSCH using a DM-RS, the measuring module 11 can be configured to use a transmitting efficiency of the PDSCH obtained based on a modulation and coding scheme (MCS) and a detected block error rate (BLER) as an assessment threshold to assess the PDSCH.

In addition, no matter if RLM measurement is performed to the SCC to determine the presence of an RLP, RLR detection is performed to a local frequency band of the SCC or RRM measurement is performed to the SCC, when measuring the ePDCCH using a DM-RS, the measuring module 11 can map a measurement result as a block error rate (BLER) of a given downlink control information (DCI) format and assess the ePDCCH based on the BLER.

According to the technical solution of this invention, improvements are made to the activation control of NCT, which is a key technique for a Small Cell Enhancement physical layer. In Rel-12, inter-site CA and dual connection and the like are hot topics for standardization. Under these scenes, due to the new characteristics of NCT and changes of the network structure (non-ideal backhaul, intense deployment), accuracy loss in RRM measurement and time delay in reporting can no longer meet the network requirements. The present application proposes reference signals used in SCC measurement. In some of the above embodiments, this application has considered the changes of NCT and carrier activation control is performed using a RLM mechanism. By way of the improvements solution of this application, RRM measurement can be performed to SCCs, and the problem that traditional RRM cannot be applied is avoided.

The followings will describe the activation control solution of the embodiments of this invention in detail.

1. Reference Signal Measurement on NCT Carriers

In a radio communication system, a reference signal is a known transmission sequence mainly used for channel estimation or channel detection and the like. Traditional CRS reference signals are removed in NCT carriers. This invention implements carrier measurement methods based on reference signals including DM-RS, CSI-RS and Reduced CRS, and realizes the RLM mechanism on NCT carriers and a carrier aggregation mechanism of NCT carriers.

2. Carrier Activation Mechanisms of NCT Carriers

In the current standardization work, main application scenes of NCT are as below: carrier aggregation is performed to NCT carriers, which function as SCCs, and traditional backward compatible carriers to serve UE. However, before the UE aggregates NCT carriers, availability of the carriers should be known. In traditional carrier aggregation mechanisms, a corresponding RSRP/RSRQ result is obtained by measuring a CRS of a target carrier by the UE and is used as the standard for assessing the signal quality of the target carrier.

On NCT carriers, Reduced CRSs realizes the above measurement in replacement of CRSs. However, since the transmission period of Reduced CRSs is quite long and Reduced CRSs are sparely distributed, the measurement accuracy is reduced greatly, causing performance loss. Therefore, this invention proposes the following several measurement methods of NCT carriers based on DM-RSs and CSI-RSs on NCT carriers. It should be noted that the following measurement methods may be used collectively or individually.

(Way I): A DM-RS of the UE is transmitted in an indicated resource block by a traditional backward compatible carrier, and the UE measures the carrier based on the DM-RS. In previous standards, DM-RSs coexist with transmission data. However, in the current case, since the UE does not activate the NCT carrier, no data is transmitted. Therefore, data may not be transmitted in the resource block or a similar all zero sequence etc. may be transmitted.

(Way II): Configuration of a CSI-RS is completed by a traditional backward compatible carrier. The UE measures the carrier by measuring the CSI-RS.

(Way III): After the UE instructs carrier aggregation of NCT to a backward compatible carrier, the NCT can configure certain resources for measurement. The resources for measurement are not continuous in the time domain, and only exist in certain subframes; they do not occupy the whole frequency band in the frequency domain, but only occupy some RB (such as RBs at the central frequency). When configuring the resource block, scheduling the user to the resource block should be avoided. Meanwhile, if multiple users applies for NCT carrier aggregation to a traditional backward compatible carrier, and if possible, the users should be arranged on the same resource block for measurement.

3. Radio Link Monitoring of NCT Carriers

Compared with traditional carriers, NCT has many new characteristics. To increase the effectiveness of data transmission, a large number of cell common control signals are cancelled by NCT. ePDCCHs on the NCT are employed to replace traditional control channels. The biggest difference of ePDCCHs from PDCCHs is that DM-RSs are used for data demodulation, and resource allocation is performed to time domain OFDM symbols. Therefore, ePDCCHs and PDSCHs are similar. At the same time, NCT needs to support the application scenes of SmallCell better in future. As future cells will be more dense, NCT needs to provide better interference coordination mechanisms.

Considering the above characteristics of NCT, the RLF detection mechanism for the physical layers require the following modifications and improvements:

BLER Mapping

The RLM mechanism for physical layers can simply define the thresholds of current in-sync and out-of-sync by mapping CRSs into BLER based on the measurement of CRSs. Therefore, the BLER mapping concept should remain effective under NCT scenes.

T310/N310/N311

The RLM mechanism for physical layers is based on T310/N310/N311 counters. This mechanism can effectively avoid ping-pong effect and achieve a balance between accuracy and sensitivity. Therefore, this mechanism should remain effective under NCT scenes.

Reference Signals

The RLM mechanism for physical layers is based on the measurement of CRSs. Under NCT scenes, since CRSs are removed, other reference signals should be used, wherein candidate reference signals include DM-RSs, CSI-RSs and Reduced CRSs.

DM-RSs should be regarded to have top priority. Since CRSs are used for demodulation of downlink control channels, traditional RLM mechanisms are based on the measurement of CRSs. The rest may be deduced by analogy, DM-RSs are used for demodulation of ePDCCHs, the RLM mechanism under NCT scenes can be based on the measurement of DM-RSs. In addition, since DM-RSs are added before precoding, precoding gains can be obtained, and the block error rate information of current resource blocks can be reflected more accurately. At the same time, as DM-RSs are UE-specific, a DM-RS based RLM mechanism actually reflects the link information of certain subband.

A CSI-RS is a UE-specific wideband measurement signal. The BS needs to configure the UE in the time domain, and a CSI-RS is usually used for the measurement of CQI, PMI, RI and the like.

A Reduced-CRS is a wideband measurement signal. Although its transmission period is relatively long (in fact, in the RLF detection mechanism, the interval between two adjacent indication is not less than 10 ms, its CRS measurement interval should be also not less than 10 ms, so a Reduced-CRS is suitable for RLM measurement in this regard), and its measurement accuracy moderate, it is suitable for RRM measurement and wideband RLM measurement on the whole.

Control Channels and Data Channels

NCT is dedicated to data transmission optimization. Data demodulation is performed through DM-RSs for both PDSCHs and ePDCCHs. Therefore, PDSCHs can be considered in an RLM mechanism under NCT scenes. As NCT is dedicated to data transmission optimization, PDSCHs are also regarded as a measurement object during deactivation of NCT, so that the measurement can maintain the transmission quality of data channels. As PDSCHs and ePDCCHs have different levels of significance (the reliability of control channels determines that data channel transmission is successful or not) and different characteristics (PDSCHs have an HARQ mechanism which can greatly reduce transmission errors, so the two types of channels have different requirements on the BLER), the assessment principles of PDSCHs and ePDCCHs are different too.

Flexible Configuration of Bandwidth

Another designed objective of NCT is flexible configuration of bandwidth. After removing control signaling/channels widely distributed across the whole band, NCT has strong bandwidth scalability. Therefore, the RLM mechanism under NCT should also have this feature.

Interference Coordination

NCT serves for deployment of Small Cell. For densely deployed small cell scenes possibly appearing in the future, the RLM mechanism under NCT should also have better interference coordination functions.

4. Deactivation Mechanisms of NCT Carriers

Due to the characteristics of reference signals on NCT, traditional RRM measurement-based carrier deactivation mechanisms will suffer substantial performance loss on NCT. Therefore, an RLM mechanism is applied to the deactivation of NCT carriers in this invention.

Radio Link Problem Detection

The RLP detection mechanism under NCT scenes is mainly based on the subband RLP detection of ePDCCHs, which is mainly based on the measurements of DM-RSs on ePDCCHs. The measurement result is mapped into a BLER transmitted in a given DCI format. Other steps are the same as those of a traditional RLM mechanism, which is based on T310/N310/N311. If the BLER is higher than a predetermined threshold in a slide window period, an out-of-sync indication will be sent to a higher level. If the higher level receives multiple out-of-sync indications consecutively, it is deemed that an RLP is detected, and a corresponding counter is started to enter the RLR process.

The RLP detecting mechanism under NCT not only considers ePDCCHs but also PDSCHs. The RLP detection of PDSCHs is also based on the measurement of DM-RSs on the PDSCHs. The assessment principle still may be based on the BLER or other criteria. For example, the overall transmission efficiency (such as the frequency spectrum utilization rate) of the current PDSCH may be obtained based on the estimated BLER and the MSC information, and used as the assessment threshold.

Type Detection of Radio Link Problem

After detecting an RLP, the source and the cause of the RLP should be identified.

If an ePDCCH has an RLP, the cause of the RLP may be determined according to the following steps:

(Step I) Configuring Full Frequency Band Measurement

The full frequency band measurement may be based on Reduced CRSs or CSI-RSs. Since CSI-RSs can be used only after configuration by the BS and are UE-specific, extra data channel resources will be occupied. Therefore, Reduced CRSs are a preferred solution when performing full frequency band measurement.

The purpose of full frequency band measurement is to determine if the current RLP is caused by deep fading of the current PRB. First, a measurement result (indicated by RSRP/RSRQ) of the current subband is obtained, and is compared with an average measurement result of the full frequency band. If the measurement result of the current subband is lower than the average measurement result of the full frequency band, it is determined that current RLP is caused by local frequency band deep fading.

Then, an assessment result may be reported to the BS through UL PCC by the UE, and carry CQI information identifying the current subbands with the best channel quality in the measurement result. After receiving the report from the UE, the BS may perform frequency diversity or adjust frequency domain position to the ePDCCHs to assist the UE in recovering from the RLP. If frequency diversity or frequency domain position adjustment to the ePDCCHs cannot recover the UE from the RLP, the UE will remove the corresponding NCT SCC from the carrier set.

If the RLP is not caused by local frequency band deep fading, the following Step II should be performed:

(Step II) Configuring Interference Measurement

If the RLP is not caused by local frequency band deep fading, it is possibly caused by excessive interference. In this time, interference measurement should be performed to the subband and the whole band to determine if the interference level of the current channel is higher than an average interference level of the whole band. If yes, the cause of the current RLP is possibly caused by excessive local frequency band interference.

Then, an assessment result may be reported to the BS through UL PCC by the UE, and carry the interference level information of the current channel. After receiving the report from the UE, the BS may perform frequency domain ICIC to assist the UE in recovering from the RLP.

If the RLP is not caused by excessive local frequency band interference either, the UE may need to perform a random access process again or remove the corresponding NCT SCC from the carrier set.

The order of the Steps I and II above may be changed. In addition, if a PDSCH has an RLP, the cause of the RLP may be determined using a similar way.

Radio Link Recovery Detection

The RLR detection mechanism under NCT scenes can be divided into subband RLR detection and wideband RLR detection.

Subband RLR Detection:

The subband RLR detection mechanism is also based on the measurement of DM-RSs on ePDCCHs. And the measurement result is mapped into a BLER transmitted in a given DCI format. If the BLER is lower than a predetermined threshold in a slide window period, the current status is an in-sync status, and an in-sync indication will be sent to a higher level. If the higher level receives multiple in-sync indications consecutively, it is deemed that the UE has recovered from the RLP. If the UE is not restored before the corresponding counter expires, it is deemed that an RLF has occurred.

In this process, if the PRB allocated by the ePDCCH is changed, the slide window and the L3filter are reset. At the same time, the T310 counter may be turned back, or the expiration threshold of the timer is extended, but the total number of extensions should be restricted.

Wideband RLR Detection:

The UE may be configured to perform wideband RLR detection, which is based on the measurement of Reduced RCSs. The wideband RLR detection mechanism is well compatible with the RLR detection mechanism of Rel-8.

Similarly, the RLR detection mechanism should also consider PDSCHs and measurements of DM-RSs on PDSCHs. In this time, the assessment indicator is not the BLER, but the overall transmission efficiency (such as the frequency spectrum utilization rate) of the current PDSCH obtained based on the estimated BLER and the MSC information.

Figure 2:
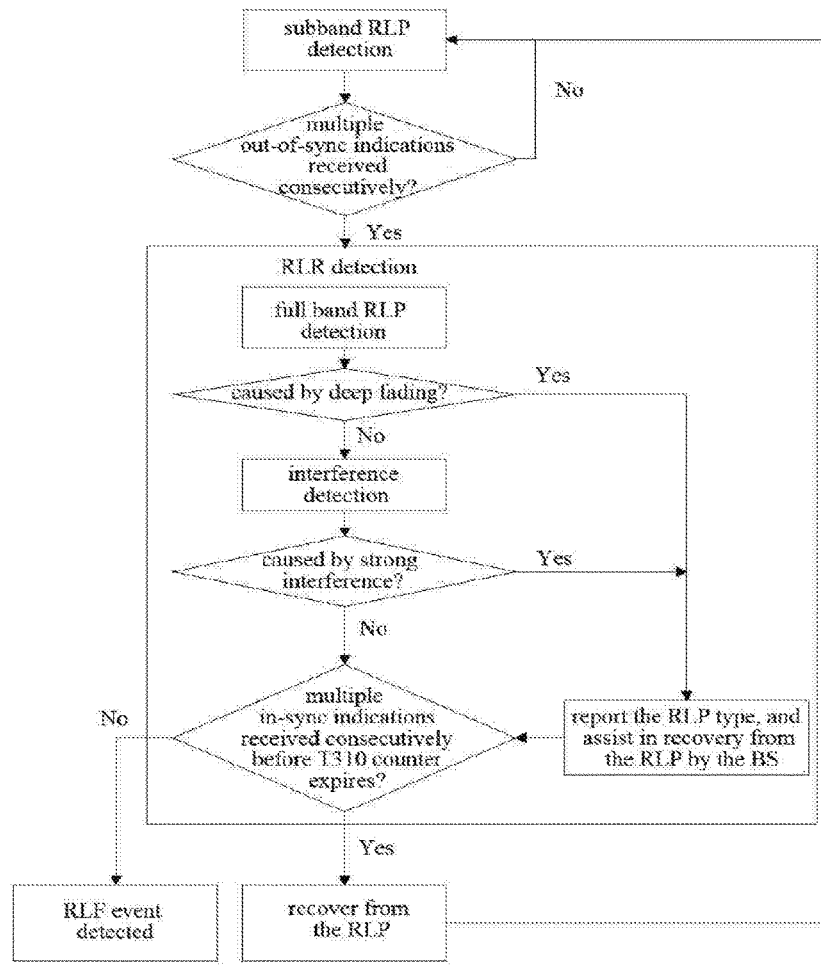
FIG. 2 is a flowchart showing the specific realization process of the NCT SCC activation control method according to an embodiment of this invention.

Referring to FIG. 2, the processes of the RLP detection, RLP type detection and RLR detection are as below:

First, if an RLP is present is determined by measuring the subband.

For example, reception may be performed based on the T310/N310/N311 counter. If multiple out-of-sync indications (such as N310 out-of-sync indications) are not received consecutively, RLP detection is continued for the subband. If N310 out-of-sync indications are received consecutively, an RLP is determined to be present, and RLR detection needs to be performed.

When performing the RLR detection, full band measurement should be performed.

It is determined that if the RLP is caused by local frequency band deep fading. If yes, the cause (RLP type) is reported to the BS, and the BS will assist the UE in recovering from the RLP.

If the RLP is caused not by local frequency band deep fading, it is determined that if the RLP is caused by excessive local frequency band interference.

If it is determined that the RLP is caused by excessive local frequency band interference, the cause (RLP type) is reported to the BS, and the BS will assist the UE in recovering from the RLP.

No matter if the cause of the RLP is detected successfully, if multiple in-sync indications (such as a predetermined number of in-sync indications) are received consecutively (before the T310 counter expires), it is determined that the UE is successfully recovered from the RLP. Then, it will be detected continuously under the normal state if the RLP is present. The detection of the RLP type (cause) can facilitate the UE in recovering from the RLP.

When performing the RLR detection, if multiple in-sync indications (for example, the in-sync indications received consecutively do not reach a predetermined number) are not received consecutively (before the T310 counter expires), it is determined that an RLF event is detected, and the occurrence of the RLF event can be announced.

This invention will be described with reference to the specific examples.

Example 1

The UE communicates with the BS using NCT and performs subband RLP detection to the ePDCCH of NCT. The specific steps are as below:
(1) measuring a DM-RS on an NCT ePDCCH, and mapping a measurement result as BLER transmitted in a given DCI format;
(2) comparing the BLER with a predetermined threshold, and sending an out-of-sync instruction to a higher level if the threshold is exceeded;
(3) the UE determining that RLP is detected if N310 out-of-sync indications are received consecutively, and preparing to enter the RLR process.

RLP detection can be performed to PDSCH on NCT similarly. The specific solution is similar to the measurement solution of ePDCCHs described in this example. The difference is that the threshold for assessment is the overall efficiency of current PDSCH transmission obtained based on the BLER estimate and the MCS information.

Example 2

After the UE detects an RLP, the cause of the RLP needs to be identified. The specific steps are as below:
(1) configuring Reduced-RS or CSI-RS-based full band measurement;
(2) comparing a subband measurement result (indicated by RSRP/RSRQ) with an average full band measurement result;
(3) if the subband measurement result is lower than the average full band measurement result, determining that RLP is caused by local frequency band deep fading;
(4) reporting an assessment result to the BS by the UE through UL PCC, with CQI information identifying the current subbands with the best channel quality; and
(5) the BS performing frequency diversity or frequency domain position adjustment to the ePDCCH based on a reporting result of the UE.

If the full band measurement result indicates that the RLP is not caused by local frequency band deep fading, interference measurement is configured according to the following steps:
performing interference measurement to the subbands and the whole band;
if the subband interference is higher than the interference of the whole band, determining that the reason for RLP is caused by excessive interference of local frequency band;
reporting an assessment result including the channel interference information to the BS by the UE through UL PCC; and
performing, by the BS, frequency domain ICIC processing based on the reporting result of the UE to assist the UE in recovering from RLP.

For PDSCHs, a similar way can be used to determine the cause of RLP.

Example 3

After detecting an RLP, the UE needs to perform link recovery through an RLR process. If the recovery fails, then RLP occurs. The RLR detection process of NCT is as below:
(1) measuring a DM-RS on an NCT ePDCCH, and mapping a measurement result as BLER transmitted in a given DCI format;
(2) comparing the BLER and a predetermined threshold, and sending an in-sync indication to a higher level if the BLER is lower than the threshold;
(3) determining that the UE is recovered from the RLP if N311 sync indications are received by the T310 timer consecutively.

RLR detection can be performed to NCT PDSCH based on DM-RSs similarly. The difference is that the threshold for assessment is the overall efficiency of the current PDSCH transmission obtained based on the BLER estimate and the MCS information.

In addition to subband RLR detection, a Reduced-CRS-based wide band RLR detection method can be configured.

An embodiment of this invention provides an NCT SCC activation control method.

Figure 3:
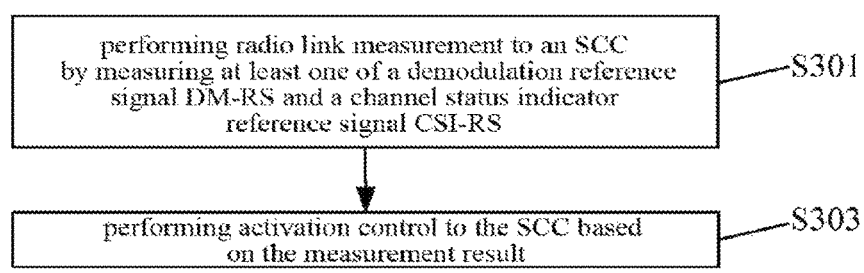
FIG. 3 is a flowchart showing the NCT SCC activation control method according to an embodiment of this invention.

As shown in FIG. 3, the NCT SCC activation control method of an embodiment of this invention comprises:
    step S301: performing radio link measurement to an SCC by measuring at least one of a demodulation reference signal (DM-RS) and a channel status indicator reference signal (CSI-RS); and
    step S303: performing activation control to the SCC based on a measurement result.

When radio link measurement is performed to the SCC, radio link measurement of the SCC may be performed using at least one of the DM-RS and CSI-RS based on the configuration information of the DM-RS and/or CSI-RS.

In addition, the radio link measurement performed to the SCC includes RLM measurement, and when performing the activation control to the SCC based on a measurement result, the SCC is deactivated if the RLM measurement determines that a radio link failure (RLF) occurs to the SCC.

The radio link measurement performed to the SCC includes radio resource management (RRM) measurement, and when performing the activation control to the SCC based on a measurement result, corresponding activation control is performed to the SCC based on an activation/deactivation instruction determined by a base station based on an RRM measurement result.

In addition, when performing RLM measurement to the SCC, an enhanced physical downlink control channel (ePDCCH) and/or a physical downlink shared channel (PDSCH) is measured using the DM-RS.

When the SCC has a radio link problem RLP during the RLM measurement, a cause of the RLP is detected and reported to a base station.

The NCT SCC activation control method of this invention may also include RLP type detection and RLR detection processes, whose details are described in the previous part and will not be repeated here.

An embodiment of this invention provides a base station device configured to manage a carrier set of user equipment containing an NCT SCC.

Figure 4:
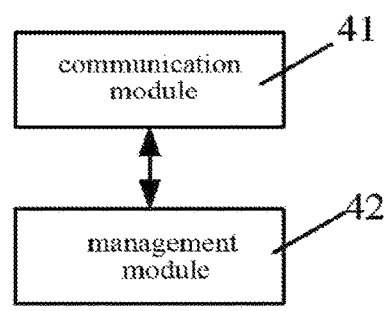
FIG. 4 is a block diagram of the base station device according to an embodiment of this invention.

As shown in FIG. 4, the base station device of an embodiment of this invention comprises:
- a communication module 41 configured to receive from the user equipment a result of radio link measurement performed to an SCC by using at least one of a demodulation reference signal (DM-RS) and a channel status indicator reference signal (CSI-RS); and
- a management module 42 configured to manage an activation status of the SCC contained in the carrier set of the user equipment based on a measurement result.

The base station device may further comprise:
a configuring module (not shown) configured to configure the DM-RS and/or CSI-RS of the SCC based on a request to measure the NCT SCC from the user equipment so that the user equipment performs the radio link measurement to the SCC using at least one of the DM-RS and CSI-RS.

The communication module 41 is further configured to receive information reported by the user equipment after the user equipment performs RLM measurement to an enhanced physical downlink control channel (ePDCCH) and/or a physical downlink shared channel (PDSCH) using the DM-RS.

Further, the information which is reported by the user equipment received by the communication module 41 includes a cause of a radio link problem (RLP), and wherein the base station device further comprises a recovery assisting module (not shown) configured to assist the user equipment in recovering from the RLP.

Specifically, the recovery assisting module is configured to: perform frequency diversity or frequency-domain position adjustment to (a) corresponding ePDCCH(s) and/or PDSCH(s) when the cause of the RLP is local frequency band deep fading; and perform frequency-domain inter-cell interference coordination (ICIC) processing to (a) corresponding ePDCCH(s) and/or PDSCH(s) when the cause of the RLP is excessive local frequency band interference. If the RLP is caused by other causes, the recovery assisting module is also configured to assist the user equipment in recovering from the RLP using other manners. Depending on the RLP type (or the cause of the RLP), the recovering way includes, but not limited to, frequency diversity, frequency-domain position adjustment of the ePDCCH(s) and frequency-domain ICIC and the like.

When the information which is reported by the user equipment received by the communication module 41 indicates that the RLM measurement result is a radio link failure (RLF) of the SCC, the managing module 42 sets the SCC contained in the carrier set of the user equipment to be deactivated.

The communication module 41 is further configured to receive from the user equipment a result of the RRM measurement performed to the SCC using at least one of the DM-RS and the CSI-RS, and the managing module 42 is further configured to set the SCC contained in the carrier set of the user equipment to be activated or deactivated based on the RRM measurement result.

An embodiment of this invention provides an NCT SCC management method configured to manage a carrier set of user equipment containing an NCT SCC.

Figure 5:
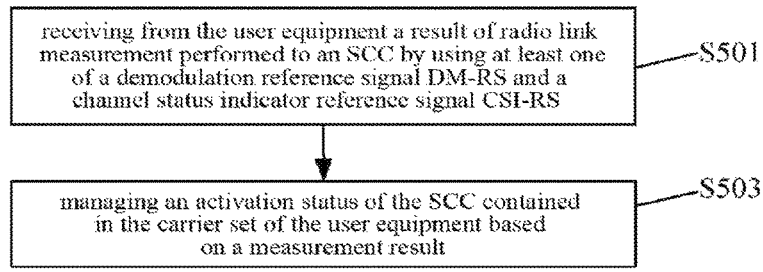
FIG. 5 is a flowchart showing the NCT SCC activation management method according to an embodiment of this invention.

As shown in FIG. 5, the NCT SCC management method of an embodiment of this invention comprises:
- step S501: receiving from the user equipment a result of radio link measurement performed to an SCC by using at least one of a demodulation reference signal DM-RS and a channel status indicator reference signal CSI-RS; and
- step S503: managing an activation status of the SCC contained in the carrier set of the user equipment based on a measurement result.

To facilitate the UE to measure the SCC, the method further comprises:
configuring the DM-RS and/or CSI-RS of the SCC based on a request to measure the NCT SCC from the user equipment so that the UE performs the radio link measurement to the SCC using at least one of the DM-RS and CSI-RS.

In addition, when receiving from the UE a result of radio link measurement performed to the SCC using the reference signal DM-RS, receiving information reported by the UE after the UE performs RLM measurement to an ePDCCH and/or a PDSCH using the DM-RS.

And receiving information reported by the UE includes receiving a cause of a radio link problem RLP; and the method further comprises: assisting the UE in recovering from the RLP based on the cause.

In addition, the method further comprises: when the received information reported by the UE includes that the RLM measurement result is a radio link failure (RLF) of the SCC, setting the SCC contained in the carrier set of the UE to be deactivated.

To sum up, considering the new characteristics of NCT and changes of the network structure, the present invention proposes reference signals used in NCT SCC measurement, which can accurately and reasonably measure NCT SCCs. By performing measurement and activation control to carriers using an RLM mechanism, this invention can effectively improve the interference coordination capacity of NCT, realizing flexible configurations of bandwidth while ensuring good performance. In addition, by way of the improvement solution of this application, RRM measurement may be performed to SCCs, so that the problem that traditional RRM measurement cannot be applied to NCT is avoided.

The basic principle of this invention has been described above. However, it should be noted that those skilled in the art can understand that all the methods and devices of this invention or any step or member thereof can be realized in any calculating device (including processors and storage media etc.) or a network of calculating devices in the form of hardware, firmware, software or a combination thereof after reading the description of this invention and using their basic programming skills.

Therefore, the objective of this invention can be realized by operating a program or a group of programs on any calculating device. The calculating device is a common used device known. Therefore, the objective of this invention can be realized by providing program products containing program codes for realizing the method or device. That is, such program products and storage media storing such program products also form this invention. Obviously, the storage media can be any known storage media or any storage media developed in the future.

Another embodiment of this invention provides a storage medium (which may be a ROM, a RAM, a hard disc, a detachable memory or the like) embedded with a computer program for performing NCT SCC activation control, the computer program being configured to execute the code segments of the following steps: performing radio link measurement to an SCC by measuring at least one of a demodulation reference signal DM-RS and a channel status indicator reference signal CSI-RS; and performing activation control to the SCC based on a measurement result.

Another embodiment of this invention provides a storage medium (which may be a ROM, a RAM, a hard disc, a detachable memory or the like) embedded with a computer program for performing NCT SCC activation management, the computer program being configured to execute the code segments of the following steps: receiving from user equipment a result of radio link measurement performed to an SCC by using at least one of a demodulation reference signal DM-RS and a channel status indicator reference signal CSI-RS; and managing an activation status of the SCC contained in the carrier sets of the user equipment based on a measurement result.

Another embodiment of this invention provides a computer program configured to execute the code segments of the following NCT SCC activation control steps: performing radio link measurement to an SCC by measuring at least one of a demodulation reference signal DM-RS and a channel status indicator reference signal CSI-RS; and performing activation control to the SCC based on a measurement result.

Another embodiment of this invention provides a computer software configured to execute the code segments of the following NCT SCC activation management steps: receiving from user equipment a result of radio link measurement performed to an SCC by using at least one of a demodulation reference signal DM-RS and a channel status indicator reference signal CSI-RS; and managing an activation status of the SCC contained in the carrier sets of the user equipment based on a measurement result.

Another embodiment of this invention provides a device including a processor, the processor being configured to execute the following NCT SCC activation control steps: performing radio link measurement to an SCC by measuring at least one of a demodulation reference signal DM-RS and a channel status indicator reference signal CSI-RS; and performing activation control to the SCC based on a measurement result.

Another embodiment of this invention provides a device (which may be provided at the base station device side or may be a part of the base station device) including a processor, the processor being configured to execute the following NCT SCC activation management steps: receiving from user equipment a result of radio link measurement performed to an SCC by using at least one of a demodulation reference signal DM-RS and a channel status indicator reference signal CSI-RS; and managing an activation status of the SCC contained in the carrier sets of the user equipment based on a measurement result.

Figure 6:
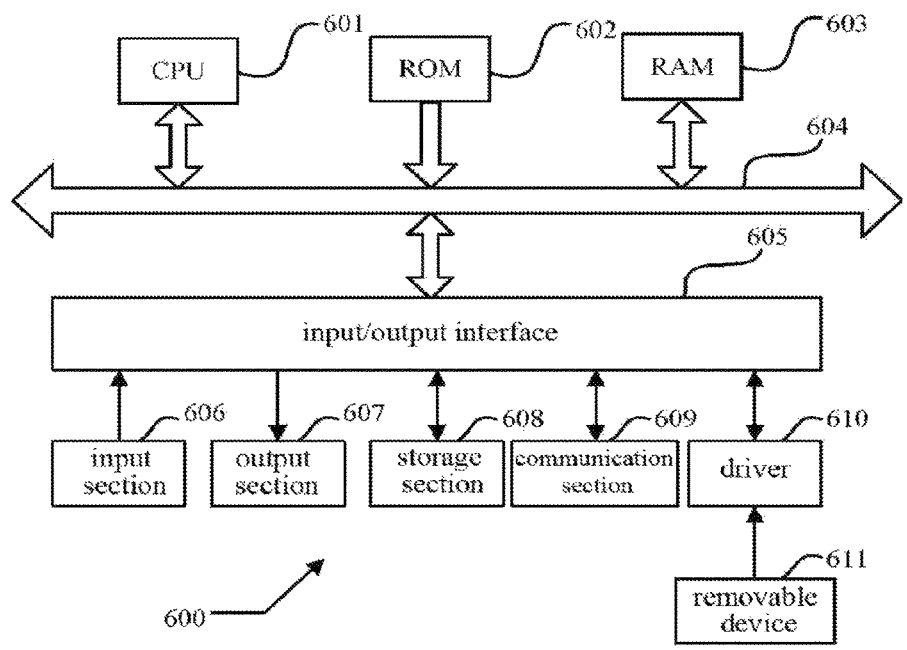
FIG. 6 is an exemplary block diagram of a computer by which a technical solution of this invention is achieved.

In an embodiment where this invention is realized by a software and/or a firmware, a program forming the software may be installed to a computer having a dedicated hardware structure from a storage medium or a network, for example, a general computer 600 shown in FIG. 6, when the computer is installed with various programs, various functions can be performed.

In FIG. 6, a central processing unit (CPU) 601 performs various processing according to a program stored in a read-only memory (ROM) 602 or a program loaded from a storage section 608 to a random access memory (RAM) 603. Data required for performing various processing by the CPU 601 may be stored in the RAM 603 if necessary. The CPU 601, ROM 602 and RAM 603 are connected with each other by a bus 604. The input/output interface 905 is also connected to the bus 604.

The following members are also connected to the input/output interface 605: an input section 606 including a keyboard and a mouse etc.; an output section 607 including a display, such as a cathode ray tube (CRT) and a liquid crystal display (LCD), and a loudspeaker etc.; a storage section 608 including a hard disc etc.; and a communication section 609 including a network interface card, such as an LAN card and a modem etc. The communication section 609 performs communication processing via a network such as the Internet.

A driver 610 may also be connected to the input/output interface 605 if necessary. A detachable medium 611, such as a magnetic disc, a compact disc, a magnetic-optical disc and a semiconductor storage etc. may be installed to the driver 610 if necessary, so that computer program read therefrom may be installed to the storage section 608.

When the above processing is realized by software, a program forming the software may be installed from a network, such as the Internet, or a storage medium, such as the detachable medium 611.

Those skilled in the art should understand that such storage media are not limited to the detachable medium 611 shown in FIG. 6 that is stores a program and can transmit a program to a user detachably from a device. Examples of the detachable medium 611 include magnetic discs (including Floppy Disc (a registered trademark)), compact discs (including compact disc ROMs (CD-ROMs) and digital versatile discs (DVDs)), magnetic-optical discs (including mini discs (MD) (a registered trademark)), and semiconductor storages. Or the storage medium may be the ROM 602 or a hard disc included in the storage section 608 which includes a program and is distributed to a user together with a device containing the same.

It should be noted that the members or steps of the device and method of this invention can be divided and/or recombined. Such division and/or recombination should be regarded as equivalent solutions of this invention. In addition, the steps of the above processing may be performed chronologically according to the description, yet the chronological sequence may not be necessary. Some steps may be performed in parallel or independently.

Although the present invention and its advantages are exhaustively described, it should be understood that modifications, substitutions and replacements may be made without departing from the spirit and scope defined by the appended claims of this invention. The terms "comprise", "include" or other variations of this application mean non-exclusive inclusion, so that a process, method, produce or device including a series of elements not only includes the listed elements, but also other elements not clearly specified or the elements inherently included thereby. When there is no other restriction, an element defined by the phrase "including/comprising a . . . " does not exclude other identical elements included in the process, method, produce or device including the specified element.

The invention claimed is:
1. A New Carrier Type (NCT) Secondary Component Carrier (SCC) activation control device, comprising:
circuitry configured to
perform, using fixed resources, a radio link measurement to an SCC by measuring a demodulation reference signal (DM-RS) and a channel status indicator reference signal (CSI-RS) to generate a measurement result, a position of the fixed resources being prestored in the activation control device; and perform activation control to the SCC based on the measurement result, wherein the radio link measurement to the SCC is performed based on configuration information of the DM-RS and CSI-RS, and the radio link measurement comprises a radio link management (RLM) measurement, wherein, when performing the RLM measurement to the SCC, the circuitry is further configured to measure a physical downlink shared channel (PDSCH) using the DM-RS, wherein the circuitry is further configured to, when measuring the PDSCH using the DM-RS, use a transmitting efficiency of the PDSCH as an assessment threshold to assess the PDSCH, and the transmitting efficiency is obtained based on a modulation and coding scheme MCS and a detected block error rate (BLER).

2. The activation control device according to claim 1, wherein the circuitry is further configured to deactivate the SCC if the RLM measurement determines that a radio link failure (RLF) occurs to the SCC.

3. The activation control device according to claim 2, wherein the circuitry is further configured to inform at least one of the RLF of the SCC and the deactivation of the SCC to a network side.

4. The activation control device according to claim 2, wherein the radio link measurement performed by the circuitry to the SCC comprises radio resource management (RRM) measurement, and the circuitry is further configured to perform corresponding activation control to the SCC based on an activation or deactivation instruction determined by a base station based on an RRM measurement result.

5. The activation control device according to claim 2, wherein when performing the RLM measurement to the SCC, the circuitry is further configured to measure an enhanced physical downlink control channel (ePDCCH) using the DM-RS.

6. The activation control device according to claim 5, wherein the circuitry is further configured to, when the SCC has a radio link problem (RLP) during the RLM measurement, detect a cause of the RLP and report the cause to a base station.

7. The activation control device according to claim 6, wherein the circuitry is further configured to perform radio link recovery (RLR) detection to the SCC, when performing the RLR detection, the circuitry is configured to perform a detection selected from the group consisting of RLR detection to a local frequency band of the SCC using the DM-RS, perform RLR detection to a full frequency band of the SCC using a Reduced cell-specific reference symbol (CRS), and a combination thereof, and when the RLR detection determines that the SCC cannot recover from the RLP, the circuitry determines that the SCC has the RLF.

8. The activation control device according to claim 5, wherein the circuitry is further configured to, when measuring the ePDCCH using the DM-RS, map a measurement result as a block error rate (BLER) of a given downlink control information DCI format and assess the ePDCCH based on the BLER.

9. A New Carrier Type (NCT) Secondary Component Carrier (SCC) activation control device, comprising:

circuitry configured to perform, using fixed resources, a radio link measurement to an SCC by measuring a demodulation reference signal (DM-RS) and a channel status indicator reference signal (CSI-RS) to generate a measurement result, a position of the fixed resources being prestored in the activation control device; and perform activation control to the SCC based on the measurement result;

wherein the radio link measurement to the SCC is performed based on configuration information of the DM-RS and CSI-RS, and the radio link measurement comprises a radio link management (RLM) measurement, wherein, when performing the RLM measurement to the SCC, the circuitry is further configured to measure an enhanced physical downlink control channel (ePDCCH) using the DM-RS, wherein, when the SCC has a radio link problem (RLP) during the RLM measurement, the circuitry is further configured to detect a cause of the RLP and report the cause to a base station, and wherein the circuitry is further configured to determine the cause of the RLP by detecting a type of the RLP, the type of the RLP comprises local frequency band deep fading and excessive local frequency band interference, and the circuitry is configured to measure a full frequency band of the SCC using at least one of the CSI-RS and a Reduced CRS, and compare a measurement result of the full frequency band and a measurement result of a local frequency band of the ePDCCH to determine the type of the RLP.

10. A New Carrier Type (NCT) Secondary Component Carrier (SCC) activation control method, comprising:

performing, with circuitry and using fixed resources, a radio link measurement to an SCC by measuring a demodulation reference signal (DM-RS) and a channel status indicator reference signal (CSI-RS) to generate a measurement results, a position of the fixed resources being prestored in the circuitry; and performing, with the circuitry, activation control to the SCC based on the measurement result, wherein the radio link measurement to the SCC is performed based on configuration information of the DM-RS and CSI-RS, and the radio link measurement comprises a radio link management (RLM) measurement, wherein, when performing the RLM measurement to the SCC, the circuitry measures a physical downlink shared channel (PDSCH) using the DM-RS, wherein, when measuring the PDSCH using the DM-RS, the circuitry uses a transmitting efficiency of the PDSCH as an assessment threshold to assess the PDSCH, and the transmitting efficiency is obtained based on a modulation and coding scheme MCS and a detected block error rate (BLER).

11. The activation control method according to claim 10, wherein, when performing activation control to the SCC based on the measurement result, if the RLM measurement determines that a radio link failure (RLF) occurs to the SCC, deactivation of the SCC is performed.

12. The activation control method according to claim 11, wherein the radio link measurement performed to the SCC comprises radio resource management (RRM) measurement, and when performing the activation control to the SCC based on the measurement result, corresponding activation control of the SCC is performed based on an activation or deactivation instruction determined by a base station based on an RRM measurement result.

13. The activation control method according to claim 12, wherein when performing the RLM measurement to the SCC, an enhanced physical downlink control channel (ePDCCH) is measured using the DM-RS.

14. The activation control method according to claim 13, wherein when the SCC is detected to have a radio link problem (RLP) during the RLM measurement, a cause of the RLP is detected and the cause is reported to a base station.

\* \* \* \* \*